Patented Feb. 13, 1951

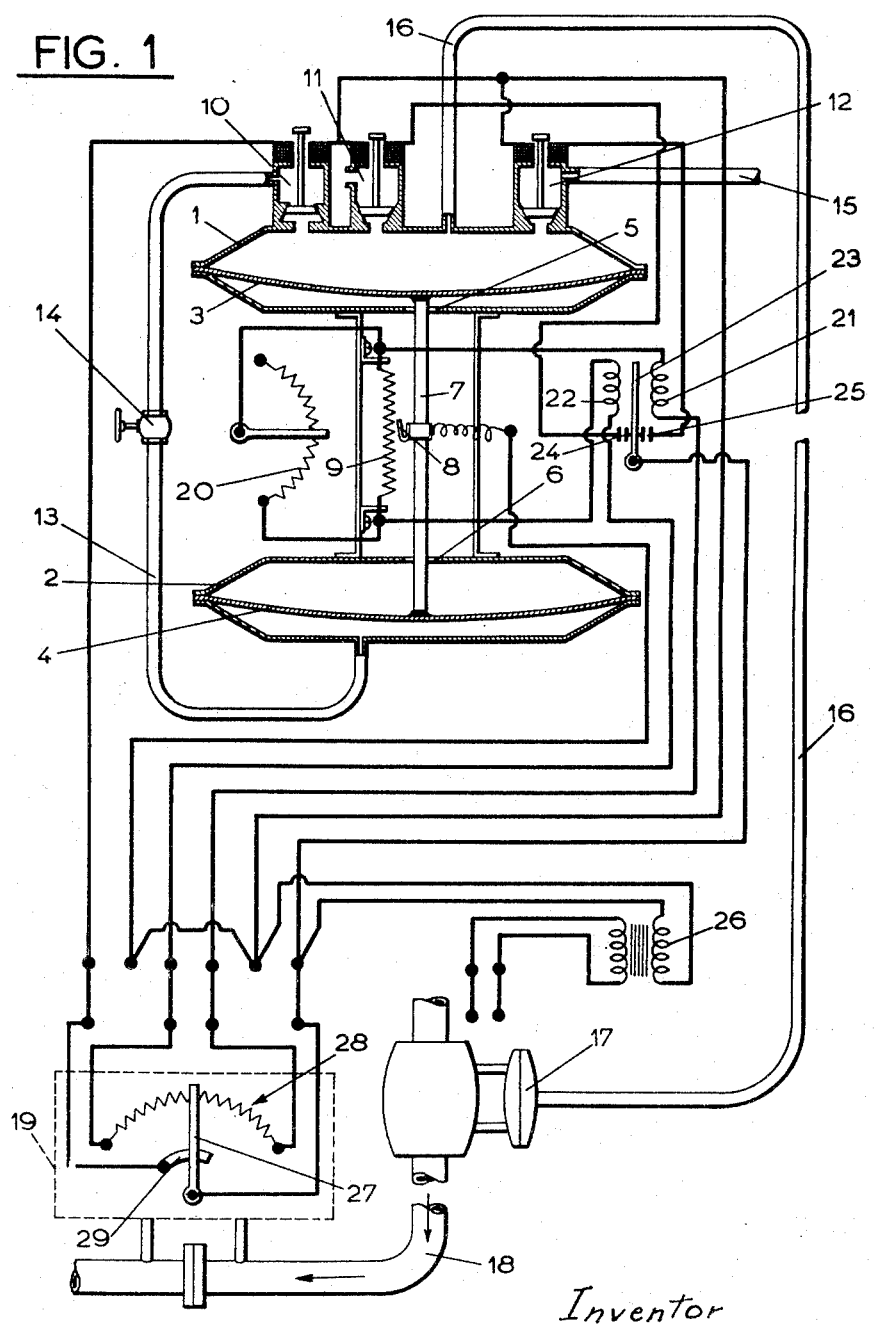

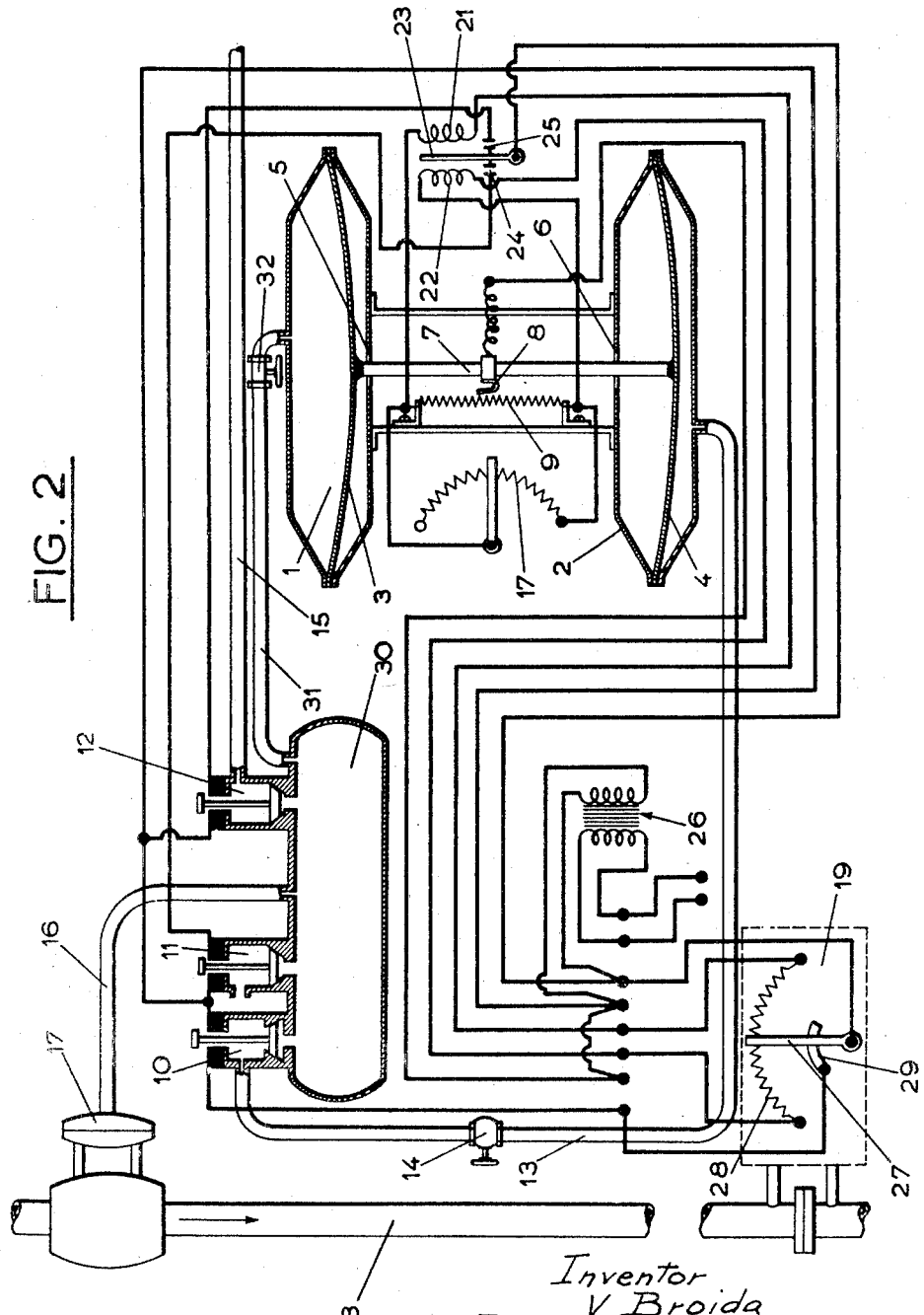

2,541,199

UNITED STATES PATENT OFFICE 2,541,199

RELAY SYSTEM WITH PRESSURE-RESPONSIVE ELECTRIC OPERATED FOLLOW-UP MEANS

Victor Broïda, Paris, France, assignor of one-third to Organisation et Securite du Travail, Paris, France, a corporation of France Application June 3, 1947, Serial No. 752,083
In France March 25, 1947

3 Claims. (Cl. 121—41)

The present invention has for its object to provide a new electro-hydraulic or electro-pneumatic relay unit adapted to convert electric variations generated by changes in a condition to be controlled or regulated with respect to an adjustment value thereof, into hydraulic or pneumatic variations operative to react upon a servomotor means so adjusted as to restore or reset said controlled condition back to said adjustment value.

Said relay unit is essentially characterized in that it is provided entirely separate from the actual regulator unit and the latter thus is capable of measuring or indicating the value of any variable condition to be controlled (such as a pressure, a rate of flow, a liquid level, a temperature and so on) and is connected to said relay unit through appropriate connections preferably electric ones. Moreover the relay unit is supplied with compressed air or other fluid at a constant predetermined pressure and transmits said compressed air or fluid to the servo-motor means at a degree of pressure depending on the electric variations received from the actual regulator unit. A part of said pressure fluid is vented to the atmosphere (if said pressure fluid is compressed air) or is recirculated to the supply means (when said pressure fluid is a liquid).

The apparatus forming the subject of this invention may be embodied in any one of various ways. Merely as an illustration of the manner in which the invention may be carried into effect and without any intention of limiting the scope thereof, two embodiments of the invention will be described hereinafter, wherein the relay is of a pneumatic nature. Said embodiments are shown in the accompanying diagrammatic drawings wherein:

Fig. 1 shows partly in elevation and partly in cross section a device wherein the regulator unit comprises a slider arm riding simultaneously over a resistor and a short contact sector, the position of said slider arm being responsive, by way of example, to the variations of a rate of flow; and Fig. 2 is a similar view showing a modification of the apparatus of Fig. 1.

In the embodiment as shown in Fig. 1, the relay unit comprises two boxes 1 and 2 wherein are disposed diaphragms 3 and 4 subdividing each of said boxes into two compartments. The pressure of the compressed air is exerted over the diaphragm 3 in the casing 1 and under the diaphragm 4 in the casing 2. As shown in the drawing, the under face of the diaphragm 3 and the upper face of the diaphragm 4 are at atmospheric pressure, the lowermost wall of the casing 1 and the uppermost wall of the casing 2 being, for that purpose, formed with apertures 5 and 6 respectively.

The diaphragms 3 and 4 are interconnected by a rod 7 which, at a suitable point intermediate its ends, carries a traveller or slider 8 adapted to ride over a resistance 9 supported for adjustment on the lowermost wall of the casing 1 and the uppermost wall of the casing 2. In those conditions, the position of the traveller 8 along the resistance 9 depends on the pressure differential between the upper side of diaphragm 3 and the lower side of diaphragm 4.

On the upper wall of the casing 1 there are supported in the herein described embodiment three electro-magnetic valves 10, 11 and 12, respectively connected as follows:

The valve 10 is connected to the lower compartment of the diaphragm casing 2 through the conduit 13 in which is provided a needle-valve 14;

The valve 11 is vented to the atmosphere (or, where the pressure fluid is a liquid, to the return pipe re-circulating said liquid to the source of supply);

Finally, the valve 12 connects with the source of supply in compressed air or pressure liquid through a conduit 15.

It will be noted that the electro-magnetic valve 10 is adapted to be closed when voltage is applied thereto, whereas the valves 11 and 12, on the contrary, are adapted to open when energized.

A conduit 16 connects the upper capacity of the diaphragm box 1 to the servo-motor means, shown in a merely illustrative way as being a diaphragm valve 17 controlling the rate of flow in a pipe 18; said rate of flow is measured by the regulator unit 19.

The resistance 9 is shunted by a rheostat 20 and has its ends connected in series with two identical windings 21 and 22 forming the energizing terminals of a differential reversing relay the reciprocable armature 23 of which is adapted to close either the pair of contacts 24 or the pair of contacts 25 according to whether the current flow through the winding 22 has a magnitude greater or smaller than the current flow through the winding 21. When both windings 21 and 22 have currents of equal magnitude flowing therethrough, the armature 24 floats in its central position as shown in Fig. 1 and both pairs of contacts 24 and 25 are simultaneously opened.

All of the above described electrical elements are supplied in low voltage power by means of a transformer 26 connected across the line.

In Fig. 1 of the appended drawings, the regulator unit 19 comprises a slider arm 27 having its position controlled by the variations in the rate of flow which is to be regulated with reference to its adjustment value and riding both over a resistor 28 and a short contact sector 29.

As will be more particularly indicated hereinafter, said regulator unit 19 could be constructed in any other suitable way and could measure any condition other than a rate of flow.

Let it be assumed that with the rate of flow to be adjusted coinciding with its adjustment value and the system as a whole then being in a condition of balance, the slider 27 of the regulator is positioned centrally of the resistor 28 and is engaging the contact plate 29; assume further that at the same instant the pressures acting over the diaphragm 3 and under the diaphragm 4 are equal, and consequently the slider 8 is positioned at the mid point of the resistance 9.

Provisionally the communication existing between the upper capacity of the diaphragm casing 1 and the lower capacity of the diaphragm casing 2 through the electro-magnetic valve 10, conduit 13 and needle valve 14 will be disregarded as when said needle valve is assumed to be tightly sealed.

In such condition, the portion of the resistor 28 to the right of the slide arm 27 and in series with the winding 21 and with the upper part of the resistance 9 (that is that part of said resistance which is included between the slider 8 and the uppermost end of the resistance) will have the same resistance value as the portion at the left of the slide arm 27 and connected in series with the winding 22 and the lower part of the resistance 9. Moreover, the resistance values of the upper and lower sections of the resistance 9 being equivalent and those of the windings 21 and 22 also being constructionally equivalent, both said windings have currents of equal magnitude flowing therethrough. It follows that the reciprocable armature 23 will continue to float at its intermediate position (as shown in Fig. 1) and the contacts 24 (controlling the opening of the valve 11) and 25 (controlling opening of the valve 12) will remain open.

In this condition of the apparatus, there will therefore be no pressure fluid admitted to the upper capacity of the diaphragm casing 1 through the conduit 15 and electro-magnetic valve 12, and no exhaust of said fluid from said capacity through electro-magnetic valve 11; the pressure exerted on the diaphragm 3 will therefore, and so long as the above condition remains unaltered, remain equal to that exerted under the diaphragm 4.

Now, if the rate of flow under control increases and reaches a value greater than its adjustment value, thereby displacing the regulator slide arm 27 towards the right, for example, such displacement will be effective to reduce the value of resistance in series with the winding 21 while increasing that in series with the winding 22; the winding 21 then having a current flowing therethrough of a magnitude greater than that of the current flowing through the winding 22, the armature 23 will be attracted towards the right and thereby close the contacts 25, causing the electro-magnetic valve 12 to open.

The fluid under pressure conveyed through said valve 12 into the upper capacity of the diaphragm casing 1 exerts upon the diaphragm 3 a greater pressure than that exerted under the diaphragm 4. As a result the rod 7 interconnecting said diaphragms is caused to travel downwardly causing a displacement of the slider 8 over the resistor 9. This results in an increase on the resistance value in series with the winding 21 and a decrease in the resistance value in series with the winding 22; the effect of this is to reduce the magnitude of the current flowing through the winding 21 and to increase that of the current flowing through the winding 22 until the reciprocable armature 23 has been restored to its initial central position as shown in Fig. 1, breaking the contacts 25 and thereby closing the electro-magnetic valve 12.

At that instant, the pressure fluid no longer reaches the upper capacity of the diaphragm casing 1 and the pressure acting on the diaphragm 3 no longer increases; the downward movement of the rod 7 and slider 8 therefore ceases and in these conditions, to each position of the slide arm 27 along the resistor 28 with reference to its central position (that is to say to each variation in the rate of flow under control with reference to the adjustment value thereof) there corresponds a pre-determined equilibrium position of the slider 8 along the resistor 9 (or, in other words, a predetermined differential pressure between the upper capacity of the diaphragm casing 1 and the lower capacity of the diaphragm casing 2).

The above operation would be repeated if the condition to be regulated rather than increasing, decreases and causes for example a displacement of the slide arm 27 towards the left from its initial center position. In this instance, the resistance value in series with the winding 22 would decrease while that in series with the winding 21 would increase. Therefore, the magnitude of the current flowing through the winding 22 would increase and that of the current flowing through the winding 21 would decrease. The armature 23 would then be attracted leftwards to close the contacts 24 thereby opening the exhaust electro-magnetic valve 11. The pressure acting on the diaphragm 3 would then drop below that acting under the diaphragm 4; the connecting rod 7 and the slider 8 rigid therewith would then rise, increasing the resistance value in series with the winding 22 and reducing that in series with the winding 21. The upward movement would continue until the decrease in the magnitude of the current through winding 22 and the increase in the magnitude of the current through winding 21 would result in the armature 23 being restored to its central position, thus breaking the contacts 24, closing the exhaust electro-magnetic valve 11, arresting the decrease in the pressure acting on diaphragm 3 and causing the connecting rod 7 and slider 8 to come to a rest.

It follows that any variation in the condition under control above or below its adjustment value causes a corresponding variation in the pressure acting on the diaphragm 3 above or below the pressure acting under the diaphragm 4 and in each case resulting in a stabilisation of said pressure for a predetermined difference between the value of the condition to be controlled and said adjustment value thereof.

If the regulated condition increases in value, then, the pressure acting on the diaphragm 3 and transmitted through the conduct 16 to the servo-motor means 17 increases also until the action of said servo-motor means 17 is effective to arrest any fresh increase in the value of the condition to be regulated. At that time, the pressure in the pressure fluid having reached a balance with the value attained by the condition under control, said pressure will no longer increase while such increase would have been the only means of continuing the action of the servo-motors and restoring the condition under control to its initial adjustment value instead of merely stabilizing it at a value in excess of the latter.

As a consequence of the foregoing, the follow-up type of control obtained in the above-described manner through a positive follow-up control of the pressure in the pressure fluid by the variations in the controlled condition, ensures a balance of the whole system for each one of a number of values of said controlled condition, which are never the same and are "scattered" about a certain average adjustment value.

To provide for an adjustment of such "scattering" and restrict the differences between said average adjustment value of the controlled condition and the various equilibrium values thereof, the resistance 9 is, according to a feature of the invention, shunted by the variable resistor or rheostat 20, adjustment of which make it possible to obtain a more or less great displacement of the slider 8 over the resistance 9 for a given displacement of the slide arm 27 over the resistance 28, that is a more or less great variation in the pressure of the pressure fluid for a given variation in the condition under control.

In the foregoing disclosure, the pressure acting under the diaphragm 4 was assumed to be unchanging and the connection existing between the upper capacity of the diaphragm casing 1 and the lower capacity of the diaphragm casing 2, through the electro-magnetic valve 10, conduit 13 and needle-valve 14, has been disregarded. However, unless the needle-valve 14 is tightly sealed, said connection does exist each time the electro magnetic valve 10 is opened as a result of breaking of the contact between slide arm 27 and contact plate 29, as said slide arm 27 disengages the plate 29 as a result of variations of sufficient amplitude in either direction in the condition to be controlled with respect to its average adjustment value.

The effect of said communication between the diaphragm boxes is more or less quickly to equalize the pressure prevailing in the upper capacity of the diaphragm casing 1 with the pressure prevailing in the lower capacity of the diaphragm casing 2, thus tending to restore the connecting rod 7 and slider 8 to the initial central position thereof. But no state of balance is possible in the system with the slider 8 engaging the center of resistance 9 unless the slide arm 27 simultaneously engages the mid point of resistance 28, that is unless the condition to be controlled is reset to its average adjustment value.

Therefore, the communication between the upper capacity of diaphragm casing 1 and lower capacity of diaphragm casing 2 provides for the automatic resetting of the controlled condition to its adjustment value by equalizing the pressures in both said capacities and causing the pressure in the first-mentioned capacity (in the assumption that this pressure increases) to rise above the value which would have enabled a balanced condition to be reached with a follow-up or positioning type of control and thus provide for a resetting of the controlled condition to its initial adjustment value.

The rate of return of the condition under control to its adjustment value is determined by the degree of opening of the needle-valve 14; said rate is equal to zero when said needle-valve is completely closed, the whole system then operating in a simple follow-up control type of operation, the equilibrium values of the controlled condition being scattered and said condition not being restored to its adjustment value.

It should be noted that, for a given degree of opening of the needle-valve 14, the rate of flow of the pressure fluid between the upper capacity of diaphragm casing 1 and the lower capacity of diaphragm casing 2 is equal to zero when both said capacities are at the same pressure level (that is at the time of the initial variation in the controlled condition and at the time the final stabilizing is obtained) and reaches a maximum when the differential pressure between both said capacities respectively itself is a maximum (i. e. when the variation of the controlled condition with respect to its adjustment value is maximum).

It follows that said rate of flow and the rate of resetting of the condition under control to its adjustment value both start from a zero value, pass through a maximum to again return to zero as the final stabilization is about to be obtained, this feature being desirable in that it reduces to a minimum the hazard of "hunting" that is the production of oscillations in the condition under control around its average adjustment value.

In the modified apparatus, as shown in Fig. 2, the electro-magnetic valves 10, 11, 12 and the conduit 16 connected with the servo-motor means 17, rather than being arranged directly upon the cover of the diaphragm casing 1 are disposed on the cover of an independent capacity 30 connected in turn through a conduit 31 on which is provided a needle-valve 32 with the upper capacity of the diaphragm casing 1.

When the needle-valve 32 is fully opened, the relay operates exactly as described previously, both capacities 30 and 1 being connected through a conduit of large sectional area and thus forming in effect a single capacity.

However, when the cross section area offered to the flow of pressure fluid from capacity 30 to capacity 1 or vice-versa is greatly reduced as a result of a corresponding setting of the needle-valve 32, any change in the pressure in said pressure fluid within the capacity 30 as a result of a change in a position of the slide arm 27 of the regulator unit 19 upon its related resistance 28 and corresponding action of the armature 23 (and consequently of the electro-magnetic valve 11 or 12) is only transmitted after a certain delay to the upper capacity of diaphragm casing 1.

It follows that the moderating or retarding action exerted by the pressure prevailing above diaphragm 3 (which action tends to limit the variation in the pressure obtained in the capacity 30 as a result of the action of one of the electro-magnetic valves 11 or 12) suffers a certain delay with respect to said variation in the pressure prevailing in capacity 30 which may thus momentarily reach values which are much higher or much lower than those attained with the needle-valve 32 wide open.

The relay system as a whole, at times just following a sudden variation in the position of the regulator slide arm 27, thus operates with highly rapid variations in the pressure of the pressure fluid, which variations are precisely adapted very rapidly to counteract the effects of said sudden variations in the condition to be controlled, before the remainder of the relay system has actually had the time to exert any material action.

In such conditions, the feature of providing the capacities 30 and 1 separate as characterizing the instant modification of the invention and the consequent possibility of reducing the sectional area offered to the movements of the pressure fluid between both said capacities by adjusting the needle-valve 32, enables the relay to respond much more rapidly than if said capacities 30 and 1 were merged into one, and thus makes it possible to counteract any sudden variations in the controlled condition.

This additional device, the action of which makes itself felt only at the start of a disturbance and the influence of which rapidly decreases as time elapses and as the pressures prevailing in capacities 30 and 1 tend to equalize each other, gives rise to a variation in the pressure of the pressure fluid which, rather than being a function of the variation in the condition under control with respect to its adjustment value (as was the case for the follow-up device formed by the diaphragm 3, connecting rod 7 and slider 8) and rather than being a function of the time elapsed since the disturbance (as was the case of the floating control device formed by the conduit 13 and needle-valve 14), is a function of the rate of change of the condition under control or, in other words, its derivative with reference to time.

The application of said additional device therefore brings into play, aside from the follow-up type of control operation (i. e. as a function of the variation in the controlled condition from its adjustment value) and aside from the floating control type of operation (as a function of the time elapsed since the disturbance) a yet third type of automatic control operation, namely so-called "pre-act" control (sometimes also termed differential control) operating as a function of the instantaneous tendency of the controlled condition or as a function of its derivative with reference to time; this additional device thus forms a means of compensating any sudden variations in the controlled condition or a so-called "rate action" control device.

The just described device further provides the following advantages.

It makes it possible to separate the actual regulator unit from the relay and thus to reduce the length of piping through which the pressure fluid has to travel. That is, it is quite easy to install the relay unit immediately adjacent to the diaphragm (valve or servo-motor means 17) supplied with pressure fluid and install the regulator unit upon the control board at a very remote location from said diaphragm valve or servo-motor means 17; in this case, it is in no way necessary to provide a deviation of the pressure fluid conduits to have them pass through said control board (as would be necessary for a purely pneumatic or hydraulic type of regulator) and said piping is simply brought to the neighbourhood of the diaphragm valve or servo-motor means 17 and the relay unit, the latter being electrically connected with the regulator apparatus 19 arranged upon the control board.

The same type of relay may be used in connection with any type of regulator device. Whether the latter be formed by a thermometer, a pyrometer, a flow meter, a pressure gauge, a dynamometer, a level regulating device, a carbonic acid gas adjusting device or any other type of the apparatus.

This makes it practicable to standardize the construction of the relay unit.

Finally, as mentioned above, it is possible to obtain for the relay various methods of automatic control operation, namely:

a. On-off control with the needle-valves 14 and 32 both closed;

b. Follow-up control with needle-valve 14 closed and needle-valve 32 fully opened;

c. Follow-up and pre-act control with valve 14 closed and valve 32 partly closed;

d. Throttling and floating control with valve 14 opened and valve 32 fully opened;

e. Throttling, floating and pre-act control with valve 14 opened and valve 32 partly closed.

It should, of course, be understood that the details of embodiment as described and illustrated have been given merely by way of example and that the same could be modified in various ways and certain elements thereof could be replaced by equivalent ones without departing from the principle of the invention.

What I claim is:

1. In a system for controlling a variable condition including an electric regulator means having an output variable in response to the variations in said condition, a source of pressure fluid and servo-motor means adapted to act upon said condition to restore the latter to a desired adjustment value; an improved relay device comprising in combination: two enclosures each subdivided into two compartments by diaphragm means, in spaced parallel relation, means for rigidly interconnecting both said diaphragms movable therewith, a slider contact on said connecting means intermediate said diaphragms movable therewith, a fixed resistance slidably engaged by said slider contact, three electro-magnetically operated valves connecting with one of said compartments in one of said enclosures, a first one of said valves being connected with the oppositely-positioned one of said compartments in the other enclosure through a conduit having a flow-adjusting means therein, another one of said valves connecting with an exhaust for said fluid, and the third one of said valves being connected with said source of pressure fluid, connecting means from said first-mentioned compartment to said servo-motor means, a variable resistance shunted across said fixed resistance, means for maintaining both remaining compartments in both enclosures at a constant such as atmospheric pressure, two identical coil windings each connected in series at each end of said resistance and adapted to form the opposite windings of a differential reversing relay, a reversible armature for said relay adapted to float in a central position intermediate said coils when said coils have a current of equal magnitude flowing therethrough and to be shifted to either one of two reversed positions in response to an excess of the current flowing through one coil over that flowing through the other coil, connections from said regulator output to each of said coils, two pairs of contacts adapted to be selectively closed by said armature in each of said positions thereof and to be simultaneously opened for said central position of said armature, a source of alternating power and a transformer to supply the various above-mentioned electric elements in low voltage alternating power.

2. A system for controlling a variable condition comprising in combination a regulator unit including a resistor, a slider slidably engaging said resistor in response to variations in said condition, a relatively short contact sector adapted to be engaged by said slider as said slider engages a central region of said resistor for a pre-determined adjustment value of said condition, a source of pressure fluid and servo-motor means adapted to act upon said condition in a direction to restore the latter to said adjustment value thereof, a relay unit including two enclosures each subdivided into two compartments by a diaphragm, means rigidly inter-connecting both said diaphragms, a sliding contact on said connecting means intermediate said diaphragms, a resistance slidably engaged by said sliding contact in response to the pressure differential present between two opposite ones of said compartments, three electro-magnetically operated valves connecting with one of said compartments in one enclosure, a first one of said valves when open providing communication with the oppositely related compartment in the other enclosure through a conduit having a flow-adjusting means therein, circuit connections for the electro-magnetic means actuating said first valve including said contact sector whereby said first valve is opened whenever said sector is not engaged by said slider, another one of said valves connecting with an exhaust for said fluid, and the third one of said valves connecting with said source of pressure fluid, connecting means from said first-mentioned compartment to said servo-motor means, a variable resistance shunted across said resistance, two identical coil windings, each connected in series to each end of said fixed resistance at one end thereof and with each end of said resistor of said regulator at the other end thereof, said windings forming the opposite coil windings of a differential reversing relay, a reversible armature for said relay electrically connected with said slider in said regulator, arranged to float in a central position intermediate said coils when said coils have a current of equal magnitude flowing therethrough and to be shifted to either one of two reversed positions in response to an excess of current through one coil over the current through the other coil as determined by the position of said regulator slider, two pairs of contacts adapted to be selectively closed by said armature in each of said shifted positions thereof and to be simultaneously opened for said central position thereof, each of said pairs of contacts selectively controlling the opening and closure of said second-mentioned and said third-mentioned electromagnetic valves, electric power supply means and circuit connections such as to cause the deviations of said regulator slider from said central region of said resistance in response to variations of said condition from said adjustment value to cause said relay through said contacts therein to operate said electro-magnetic valves in a direction to cause said pressure fluid to operate said servo-motor means to restore said condition to said adjustment value thereof.

3. A system for controlling a variable condition comprising in combination an electric regulator means adapted to supply to output terminals therein a current variable in response to variations in said condition with reference to an adjustment value thereof, a source of pressure and servo-motor means adapted to act upon said condition to restore the latter to said adjustment value, a fluid capacity, conduit means connecting said capacity with said servo-motor means, three electro-magnetically actuated valves connecting with said capacity, one of said valves when open providing communication with said source of pressure fluid, another one of said valves when open providing an exhaust for said pressure fluid, a relay device including two enclosures each subdivided into two compartments by a diaphragm, one of said compartments in one of said enclosures being connected with said capacity through a conduit having flow adjustment means therein, the oppositely related compartment, in the other enclosure, being connected with said capacity through the remaining one of said electromagnetic valves and a conduit having flow-adjusting means therein, means for maintaining the two remaining compartments at a constant pressure, means rigidly interconnecting both said diaphragms, a sliding contact on said connecting means intermediate said diaphragms movable therewith, a fixed resistance slidably engaged by said sliding contact in response to the pressure differential present between two opposite ones of said compartments, a variable resistance shunted across said fixed resistance, two identical relay coils each connected at one end thereof with each end of said fixed resistance and at the other end thereof with each of said regulator output terminal, a reversible armature shiftable between two positions in response to an excess of current through one relay coil over the current through the other relay coil, two pairs of contacts adapted to be selectively closed by said armature in each of said shifted positions thereof, and to be simultaneously opened for said central position thereof, each of said pairs of contacts selectively controlling opening and closure of said first and said second-mentioned electro-magnetic valves, electric power supply means and circuit connections such as to cause said differential variations in said regulator output in response to variations in said condition from said adjustment value thereof, to cause said relay through said contacts therein to operate said first- and said second-mentioned electro-magnetic valves in a direction to cause said pressure fluid to operate said servo-motor means to restore said condition to said adjustment value thereof as adjusted through said third mentioned electro-magnetic valve.

VICTOR BROÏDA.

REFERENCES CITED

The following references are of record in the file of this patent:

UNITED STATES PATENTS

| Number | Name | Date |
|---|---|---|
| 971,207 | Michel | Sept. 27, 1910 |
| 1,823,225 | Wright | Sept. 15, 1931 |
| 2,104,627 | Manteuffel | Jan. 4, 1938 |
| 2,262,173 | Fischer | Nov. 11, 1941 |
| 2,317,383 | Hull | Apr. 27, 1943 |
| 2,403,917 | Gille | July 16, 1946 |
| 2,413,907 | Brant | Jan. 7, 1947 |